United States Patent [19]

Seguine

[11] 4,200,509
[45] Apr. 29, 1980

[54] METHOD FOR DEWAXING REFINED VEGETABLE OILS FOR REFRIGERATOR CLARITY STABILITY

[75] Inventor: Edward S. Seguine, Fairfield, Ohio

[73] Assignee: The Procter & Gamble Company, Cincinnati, Ohio

[21] Appl. No.: 52,366

[22] Filed: Jun. 27, 1979

Related U.S. Application Data

[63] Continuation-in-part of Ser. No. 972,643, Dec. 22, 1978.

[51] Int. Cl.² .............................................. B03C 5/00
[52] U.S. Cl. ..................................................... 204/186
[58] Field of Search .............................. 204/184–191, 204/180 R

[56] References Cited

U.S. PATENT DOCUMENTS

| 2,054,075 | 9/1936 | Fisher | 204/184 |
| 2,302,386 | 11/1942 | Fisher | 204/184 |
| 2,617,763 | 11/1952 | Fischer | 204/184 |
| 3,928,158 | 12/1975 | Fritsche | 204/188 |
| 4,035,402 | 7/1977 | Levine | 260/425 |

Primary Examiner—T. M. Tufariello
Attorney, Agent, or Firm—Leonard Williamson; Julius P. Filcik; Rose Ann Dabek

[57] ABSTRACT

A method of dewaxing an electrical high-resistivity refined vegetable oil, containing no more than 0.1% moisture, to provide a dewaxed clear liquid vegetable oil having excellent refrigerator clarity. The method comprises slowly tempering the oil at 25° C. to 50° C. until the waxes nucleate into seed crystals. Then growing the nucleated wax crystals at a cool temperature of 28° C. or below for at least another hour. Then passing the cooled oil through an electrofilter to provide a clear refrigerator stable salad or vegetable oil.

14 Claims, 1 Drawing Figure

U.S. Patent
Apr. 29, 1980
4,200,509
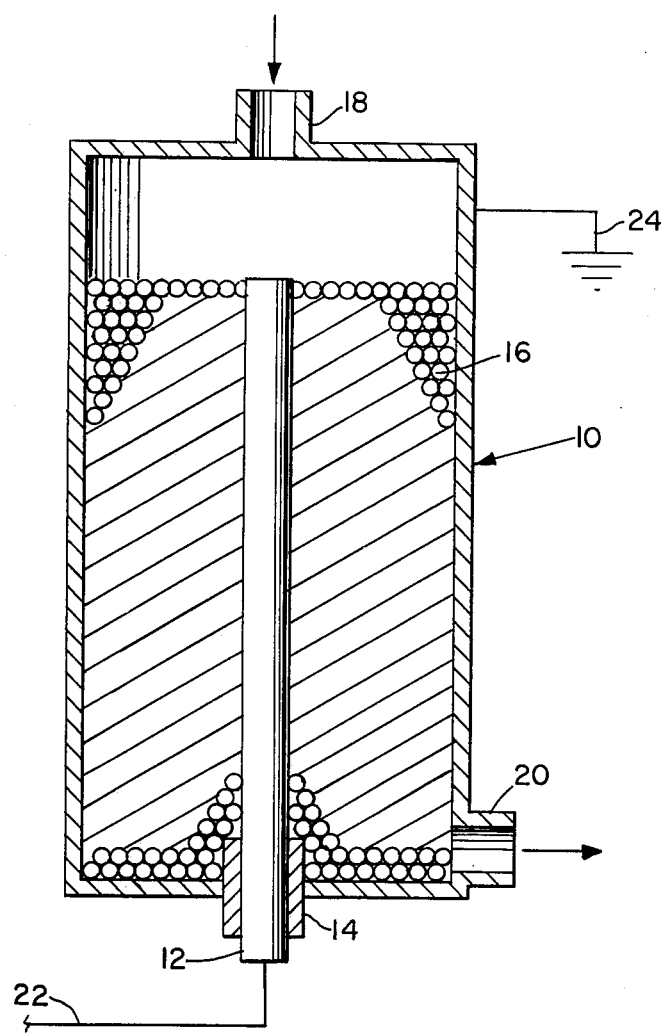

METHOD FOR DEWAXING REFINED VEGETABLE OILS FOR REFRIGERATOR CLARITY STABILITY

CROSS-REFERENCE TO RELATED APPLICATIONS

The present application is a continuation-in-part of copending application Ser. No. 972,643, filed Dec. 22, 1978.

TECHNICAL FIELD

This invention is directed to a process for removing electrically non-conductive contaminants, particularly waxes, from high-resistivity oils.

BACKGROUND OF THE INVENTION

This invention particularly relates to an improved process for dewaxing refined vegetable oils and, more particularly, to a process in which consistently efficient separation of undesirable waxes, particularly high-melting fatty acid esters, can be achieved for oils such as sunflower, safflower, and corn oil for refrigerator clarity stability. Vegetable oils, and more particularly edible vegetable oils, are used as salad oils, cooking oils, margarine constituents, and the like. Safflower, sunflower and corn oil, in particular, are often used in these and other food applications.

For purposes of this application the terms "wax" and "high-melting material" are used interchangeably and are intended to be generic to the many substances which can cause clouding in refined liquid vegetable oils at temperatures of less than about 60° F. (15.5° C.).

A problem which arises in the purification of vegetable oils is that the crude oils tend to have high contents of undesirable insoluble material. Natural vegetable seed oils are composed of mixtures of many naturally produced chemical compounds, including not only the oily constituents but also, usually, small percentages of natural phosphatides, vegetable waxes, pigments, and many other compounds. The oily constituents, namely, the glyceride esters of the long chain fatty acid of the saturated and unsaturated types, make up the largest fraction of vegetable oils. Such materials to a large extent determine the properties of the oil, but the remaining constituents also exert a marked and sometimes detrimental effect, depending upon the use to which the oil is put.

Some natural vegetable oils of commercial grade, such as safflower, sunflower, cottonseed oil, soybean oil, peanut oil and corn oil, become cloudy after having been chilled or cooled to somewhat lower than room temperatures, as in a refrigerator, and remain cloudy when returned to ordinary (room) temperatures. The cloudiness may be followed by a settling out of an opaque layer, a particularly disadvantageous occurrence when the oil is packed in glass and where clarity and brightness are of importance.

A large portion of the high-melting material can be removed from oils by a process known as "winterizing" in which the oils are carefully cooled to low temperatures for extended periods of time to permit precipitation of solid material. Solid material can then be removed by pressing or other separation procedures. However, not all of the high-melting solid material is removed from oils by winterizing, and the oil still tends to cloud when stored for extended periods of time at low temperature. Moreover, the usual winterizing treatment undesirably tends to remove by entrainment a substantial portion of the olein fraction of the oil.

Many previous attempts have been made to remove wax fractions from crude vegetable oils by mechanical separation, such as centrifuging and filtration at low temperatures. These techniques have been somewhat unsuccessful due in part to the small differences in specific gravity between the wax and the vegetable oil and also due to the compaction of the vegetable oil wax under pressure in a filter to a slime or grease consistency which resists the passage therethrough of the vegetable oil.

U.S. Pat. No. 4,035,402 to Levine, July 12, 1977, discloses a process for effectively dewaxing vegetable oils which comprises: "chilling a refined and water-washed or filtered vegetable oil, mixing the chilled vegetable oil with a dilute alkaline solution, gently agitating the resulting mixture, centrifuging the mixture and separating a heavy phase which contains wax and other impurities from a light phase which may then be bleached and deodorized to form a clear oil".

It has also been suggested to employ electrofiltering techniques for the removal of suspended particulate matter in the oils, both with and without some type of media disposed between electrodes. For example, a method and apparatus for removing electrically conductive suspended contaminants from high-resistivity oils free of significant amounts of dispersed water, disclosed in U.S. Pat. No. 3,928,158 to Fritsche et al, Dec. 23, 1975, incorporated herein by reference in its entirety, particularly its teachings with respect to the electrofilter apparatus.

U.S. Pat. No. 2,054,075, Fisher, teaches chilling wax-bearing inedible oil in the presence of a suitable diluent containing precipitated wax. Fisher teaches "shock chilling" the oils at $-20°$ F. and $-40°$ F. Similarly, U.S. Pat. No. 2,617,763, Fischer, teaches an electrically aided filter system for removing paraffinic waxes from inedible oil: "For example, wax crystals in propane-deasphaltized residual oils in a nonconductive dichloroethane solvent, chilled to $-25°$ C. by a conventional method, are smaller in average size than the diameter of the openings in the weave formed by the electrical conductors 14 and 15. Obviously, the filter structure without an electrical charge will allow part of the crystals to pass through the filter. However, by placing a charge of only a dozen to a few hundred volts, the crystals are retained by the filter and the filtrate pour point is improved by 4° F. to 10° F. with the application of from approximately 50 to 500 volts." Col. 3, lines 30-45.

Another patent, U.S. Pat. No. 2,302,386, Fisher, teaches on page 3, lines 43-49 (rhc) of that patent that: "Rapid chilling such as this is known as 'flash chilling' or 'shock chilling' and apparently results in the formation of a finer wax precipitate than is formed by slower cooking methods. *The formation of such fine precipitates is advantageous in the electrical dewaxing process.*" (Emphasis added.)

While such methods may be classified in the same general class as that of the present invention, it is quite evident to those skilled in the art that neither the Levine nor the electrofilter patents teach the advantage of a slow controlled tempering step before electrofiltration for the removal of high-melting fatty acid esters and similar contaminants from refined vegetable oils to provide refrigerator clarity stable oils. It will also be understood that while prior electrofilter techniques have been reasonably effective when dealing with conductive contaminants, such as certain hydrogenation catalysts, a different problem is posed when handling nonconductive waxes and similar contaminants in refined vegetable oil.

OBJECTS

In view of the above, it is an object of this invention to provide an improved process for the dewaxing of refined and water-washed or filtered vegetable oils using an electrofilter.

Another object of the present invention is to provide an improved electrostatic process for dewaxing vegetable oils which comprises dielectrophoresis, the action of a non-uniform electric field on equal amounts of bound positive and negative charges (polarized material) of dielectric solid or fluid.

It is a further object of this invention to provide a dewaxed vegetable oil which is suitable for use as a salad oil after it has been bleached and deodorized.

It is an important object of this invention to provide a dewaxed vegetable oil having excellent refrigerator clarity of greater than 24 hours at 32° F. (0° C.) to 40° F. (4.4° C.).

These and other objects will become apparent from the discussion below.

BRIEF DESCRIPTION OF THE DRAWING

The drawing is a schematic cross-section of an apparatus used in the practice of the present invention.

DETAILED DISCLOSURE OF INVENTION

A process for removing waxes, particularly highmelting fatty acid esters, and other contaminants from a refined vegetable oil free of significant amounts of dispersed water, comprising the steps of: (a) tempering said oil at a sufficiently cool temperature until said waxes nucleate and begin crystal growth, (b) growing said nucleated wax crystals at an appropriately cool temperature until said wax crystals are large enough to be electrostatically removed by dielectrophoretic filtration, and (c) passing said cooled oil of step (b) through an electrofilter at an appropriate flow rate sufficient to trap said crystallized waxes in said electrofilter, said electrofilter comprising an electrostatic field and a wax trapping filter means for dielectrophoretic filtration.

According to the present invention, a wax containing refined and water-washed or filtered vegetable oil having a low fatty acid content, a low soap content, and less than 0.1% moisture, is chilled until said waxes begin crystal nucleation and held for a time period until said crystals have grown sufficiently large enough to be removed by electrostatic dielectrophoretic filtration. The resulting chilled oils are passed through interstitial spaces defined within a mass of substantially spherical glass or ceramic beads of high electrical resistivity wherein a high gradient electrostatic field is maintained across said mass. The waxes are trapped therein. The resultant oil is dewaxed, which may be later bleached and deodorized to form an improved clear oil, i.e. salad oil.

Oils which are suitable for salad use frequently are stored in refrigerators. The prolonged cooling of such oils to temperatures normally encountered in refrigerators, such as from about 0° C. to about 10° C., generally results in the deposition of crystalline material, usually solid triglycerides or waxes (fatty acid-fatty alcohol esters) from the oil. This material may appear in the form of a cloud, or as clusters of crystals and is considered objectionable by the housewife. In general, the tendency to form solid triglycerides in oils also adversely affects the suitability of the oil for use in mayonnaise emulsions. Mayonnaise emulsions prepared from such oils tend to be unstable at low temperatures and are more easily broken.

The process of this invention includes a procedure known as "dewaxing" which has been developed to process those oils which contain waxes which precipitate at refrigerator temperatures. The most common of such oils are sunflower, safflower and corn oils, although many other vegetable oils encounter similar problems. As mentioned previously, it is preferred that the oil to be dewaxed have a low soap content and a low free fatty acid content, in addition to being refined or water-washed. The low soap and fatty acid content, of course, is a direct result of the refining and/or water-washing procedures. More particularly, a refining procedure which has been found suitable for the practice of this invention is described in U.S. Pat. No. 3,103,898 (1963) issued to Schmitt and entitled "Process for the Purification of Glyceride Oils".

"Refining" is commonly referred to as the removal of gross impurities, gummy or mucilaginous material and the free fatty acids from oils and as herein used the term excludes "bleaching" (color removal) and odor removal. Known methods of refining include contacting the oil with strong or dilute alkaline material followed by separation of impurities, by liquid-liquid extraction of impurities from the oils, or by some form of steam distillation, and/or by contacting the glyceride oils with acids. The ultimate objective of a refining operation is to remove every undesirable impurity completely, while at the same time maintaining intact all of the desirable oil. The particular process used with a given oil is determined by the foregoing consideration of maximum impurity removal with a minimum of oil loss.

Crude vegetable oils will typically contain a mixture of naturally produced materials, such as free fatty acids, phosphatides, pigments and the like, and these compounds will be removed in part by conventional, e.g. alkali, refining operations. The extent to which these impurities are removed by a refining operation can be conveniently expressed in terms of the amount of free fatty acid or soap present in a refined oil in relation to the content of such materials in the corresponding crude oil.

Frequently, it will be difficult to measure the concentration of certain impurities which may even be of undetermined constitution and it will be convenient to express their removal during refining by reference to the amount of free fatty acid or soap removed from the crude oil. The oils should have a low fatty acid content of less than about 0.1% and, in addition, the oils should have a low soap content of less than about 0.1%. Thus, it will be appreciated that degree of refining can be expressed in terms of a fatty acid or soap specification recognizing that the refining operation will have removed from the crude oil impurities in addition to free fatty acids and that the expression of free fatty acid or soap content reflects the extent to which impurities in general are removed from a crude vegetable oil.

The oil, preferably refined and/or water-washed oil, is the tempered using standard, mildly agitated chilling apparatus to less than 50° C., preferably 25° C. to 50° C., and held at these chilly temperatures until wax nucleation and crystal growth begins. Then the wax crystals are further grown at a temperature below 28° C. and preferaly at a temperature of from about 0° C. to about 28° C., and preferably at a temperature of from about 12° C. to about 20° C. until the wax crystals are sufficiently large enough for electrofiltration.

In a refined oil, tempering at a range of temperatures of from about 25° C. to about 50° C. takes at least about 12 hours and further crystallization growth of the resultant nucleated waxes at said preferred temperature of 0° C. to about 28° C. for at least 1 to about 5 hours or longer. Upon completion of crystallization growth, the oil is then passed through an electrofilter to remove said wax crystals and other contaminants by electrostatic dielectrophoresis action, said waxes being trapped on a filter means within an electrostatic field. Preferably, the electrofilter comprises interstitial spaces defined within a mass of substantially spherical ceramic beads of high electrical resistivity wherein a high gradient electrostatic field is maintained across said mass. The method is particularly useful for dewaxing refined vegetable oils. A preferred electrofilter apparatus is disclosed in U.S. Pat. No. 3,928,158 to Fritche et al., Dec. 23, 1975, herein incorporated by reference. The interstitial spaces within said mass or particulate bed comprises substantially spherical nonporous and nondeformable glass-ceramic beads of high electrical resistivity having a smooth outer surface and diameters in the range of about 0.175 mm, to about 6.5 mm, and maintaining an electrostatic field having a voltage gradient of at least about 2 kv/cm substantially horizontally across said bed during the flow of the oil. The use of even higher voltages is desirable so long as dielectric breakdown of the oil does not occur; at least 6 kv/cm is preferred.

It is believed that the accumulation of the waxes at the points of contact is caused by the electrical resistivity of the beads being higher than the resistivity of the liquid being filtered. Selection of beads that will give best performance of the filter consequently will depend on the vegetable oils that are to be passed through the filter. If the filter bed comprises beads of relatively high resistivity glass, for example, glass having a resistivity of $1 \times 10^9$ ohm-cm, and the liquid filtered has a lower resistivity, effective separation of solids is obtained.

An essential characteristic of the electrofilter is that it be capable of being quickly, thoroughly and repeatedly cleaned of solids accumulated in the filter to recondition the filter for further use.

The material suitable for the filter media, in addition to having a high electrical resistivity, must also be substantially smooth and substantially nondeformable. Substantially smooth does not mean that the surface of the individual particles of the media cannot have any surface irregularities whatsoever but rather that the surface areas of such particles are not substantially greater than the theoretical surface area attributable to their substantially spherical shape. It is believed that the effect of a rough surface is not only that such a surface provides sheltered niches in which waxes can be lodged, but also surface irregularities are believed to cause a nonuniform electrostatic field on the surface of the beads and the nonuniform field encourages the accumulation of solids over the surface of the beads other than at points of contact between adjacent beads.

For a more detailed discussion of suitably sized beads used in electrofilters, see Columns 4 and 5 of U.S. Pat. No. 3,928,158 to Fritsche et al., Dec. 23, 1975, herein incorporated by reference.

It has been discovered that it is necessary to backflush the filter frequently with a hot aqueous liquid. The backflushing is accomplished by flowing hot water preferably upwardly through the filter bed at a rate causing expansion of the filter bed and movement of the beads relative to one another while the voltage gradient, and consequently the electric field, is interrupted. A hot oil can also be used for backflushing, but hot water having a temperature of about 95° C. or higher is preferred.

A more important operating condition in the electrofiltering process is the flow rate of the oil to be treated through the mass of particles comprising the media, since the residence time of the oil in the media and the electrostatic field quantitatively affects the removal of the undesired waxes and other contaminants.

In the drawing there is shown a hollow, cylindrical steel vessel 10 with a cylindrical rod-shaped electrode 12 positioned coaxially within vessel 10 and extending through the base of vessel 10. Electrode 12 is also insulated from vessel 10 by means of insulating collar 14 which is positioned about the portion of electrode 12 passing through the base of vessel 10. Disposed within vessel 10 and completely filling the annular space defined between the inner wall of vessel 10 and electrode 12 is a mass of substantially spherical, smooth surfaced, glass beads 16. At the upper end of vessel 10 is located an oil input port 18, while at the lower end of vessel 10 is located an oil outlet port 20 thereby permitting flow of contaminated oil from inlet port 18 through vessel 10 and the mass of glass beads disposed therein and permitting removal of oil via outlet port 20. Oil outlet port 20 is connected with lines suitably valved and arranged for backflushing the mass of glass beads with a hot water or hot oil to recondition the filter for further use.

Electrode 12 is connected to a high voltage power supply by means of conductor 22 while vessel 10 is connected to ground by means of line 24.

In order to illustrate in greater detail, reference is now made to the following examples:

EXAMPLE I

About 30 liters of 82° C. refined sunflower seed oil having about 0.066% moisture and 0.03% wax content was chilled by placing it in an ice bath until it reached a temperature of about 43° C. At this point the oil was tempered at about 27° C. in a constant temperature room with constant mild agitation for about an average time of 19 hours. Nucleation of wax crystals was observed. The nucleated wax crystals were grown at a temperature of about 15° C. for about 4 to 5 hours. This growing crystallization was staged hourly with quick chilling taking place between movement from 43° C. to 27° C. The electrofilter was first filled with dewaxed oil to allow the undewaxed oil to flow smoothly through the filter on starting the run.

The apparatus employed comprised a vertically disposed 10.16 cm ID hollow cylindrical steel shell 35.56 cm long. Positioned coaxially within this shell was an 0.32 cm diameter steel rod terminating 2.54 cm below the top of the shell. The steel rod was electrically connected to a zero to 30 kv variable transformer through a rectifier, while the steel shell was grounded to provide a DC voltage aross the electrodes.

The individual particles of the media employed were substantially nondeformable glass beads having an average diameter of about 0.32 cm. By nondeformable is meant that there is no appreciable distortion in configuration of the particles under the loads normally encountered in the processing herein. The characteristic is important since it is not desired to increase contact area between the adjacent beads or between the electrode surface and the glass beads.

The electrofilter was set at 30 kv which is about 6 kv/cm, and the run began with a target flow rate of 50 ml/min. The following data resulted:

| Cum. Vol. Through Filter (ml) | Sample # | Flow Rate | Chill Tests* 0° C. (hrs) | 4.4° C. |
|---|---|---|---|---|
| 2,320 | #1 | 58 ml/min | 77–96 | 25–48 |
| 7,465 | #2 | 49 ml/min | 77–88 | 135–144 |
| 10,405 | #3 | 49 ml/min | 77–88 | 25–40 |
| 14,080 | #4 | | 88–93 | 48–77 |
| 17,020 | #5 | | 77–120 | 25–40 |
| 20,620 | #6 | | 77–136 | 40–44 |
| 23,116 | #7 | 48 ml/min | 117–140 | 16–21 |
| 27,487 | #8 | 47 ml/min | 24–40 | 3–16 |

*Avg. 50 ml/min.

EXAMPLE II

Same as Example I except that the oil was quick chilled from 82° C. to about 38° C. and then tempered at about 27° C. for 20±4 hours for nucleation. The oil was then quick chilled in 2 hour batches down to about 15° C. and held there for further crystallization for 5±1 hours.

The electrofilter was prepared by pouring about ½ gallon of dewaxed oil through the electrofilter to remove residual water. The electrofilter was set at 30 kilovolts and a target flow rate of 50 ml/min.

| Sample # | Cumulative Vol. (ml) | Flow Rate (ml/mn) | Chill Tests (hr)* 0° C. | 4.4° C. |
|---|---|---|---|---|
| #1 | 2,290 | 46 | 71–96 | 73–91 |
| #2 | 17,470 | 46 | 50–90 | |
| #3 | 26,290 | 48 | 50–71 | 0–17 |
| #4 | 28,290 | 50 | 71–96 | 17–25 |

EXAMPLE III

Same as Example II except that the oil was tempered at 27° C. for 22±4 hours instead of 20±4.

The electrofilter was prepared by pouring about ½ gallon of dewaxed oil through it to remove any residual water from backflushing. The electrofilter was set to 30 kilovolts and a target flow rate of 50 ml/min.

| Sample # | Cumulative Vol.(ml) | Flow Rate (ml/min) | Chill Tests (hrs)* 0°C. | 4.4° C. |
|---|---|---|---|---|
| #1 | 2,800 | 47 | 114–137 | 25–42 |
| #2 | 5,980 | 48 | 48–89 | 42–64 |
| #3 | 9,180 | 49 | 89–100 | |
| #4 | 11,780 | 54 | 89–100 | 809+ |
| #5 | 14,840 | 48 | 48–100 | |
| #6 | 17,720 | 48 | 89–100 | |
| #7 | 20,600 | 48 | 48–137 | 809+ |
| #8 | 23,480 | 48 | 48–100 | 809+ |
| #9 | 24,900 | 48 | 89–100 | |

*Three replicates were tested for each sample and the resultant range of hours data appears in the tables. The above data shows that a substantial amount of oil waxes were removed because the undewaxed oil had a zero hour chill test at both temperatures.

A higher voltage gradient of about 10 kv/cm was found to be even more efficient in the practice of the present invention. Some refined sunflower seed oil was dewaxed in the electrofilter described in the above examples, except that voltage gradients of about 10 kv/cm were successfully employed. It appears from data obtained that the higher the voltage gradient used, the better the dewaxing. The electrofilter equipment and possible damage to the oil are the only limitations to the use of higher voltage gradients in the practice of the present invention.

What is claimed is:

1. A method of dewaxing a refined vegetable oil, free of significant amounts of dispersed water, to provide a dewaxed liquid vegetable oil having excellent refrigerator clarity, said method comprising the steps of:
    (a) tempering said refined vegetable oil at a sufficiently cool temperature until said waxes nucleate and begin crystal growth, wherein said nucleation temperature is from about 25° C. to about 50° C., and wherein said oil is tempered for at least about 12 hours,
    (b) growing said nucleated wax crystals at an appropriately cool temperature until said wax crystals are large enough to be electrostatically removed by dielectrophoretic filtration, wherein said growing temperature is no higher than about 28° C. for at least about 1 hours, and
    (c) passing said cooled oil of step (b) through an electrofilter at an appropriate flow rate sufficient to trap said crystallized waxes in said electrofilter to provide said dewaxed vegetable oil having excellent refrigerator clarity, said electrofilter comprising an electrostatic field and a wax trapping filter means for dielectrophoretic filtration.

2. The method of claim 1 wherein said nucleated waxes are further grown at a temperature of from about 4° C. to about 16° C. for at least about 1 hour.

3. The method of claim 1 wherein said refined oil is selected from the group consisting of safflower, sunflower, cottonseed, soybean, peanut and corn oil.

4. The method of claim 1 wherein said refined oil is sunflower seed oil.

5. The method of claim 1 wherein said refined oil has a wax content of from about 0.01% to about 2%.

6. The method of claim 1 wherein said electrofilter comprises interstitial spaces within a particulate bed of substantially spherical nonporous and nondeformable glass-ceramic beads of high electrical resistivity having a smooth outer surface and diameters in the range of about 0.08 cm to about 0.635 cm and maintaining an electrostatic field having a voltage gradient of at least about 2 kv/cm substantially across said bed during the flow of the oil.

7. A method as set forth in claim 6 in which the said voltage gradient is about 10 kv/cm.

8. A method as set forth in claim 6 in which the electrostatic field is interrupted periodically and a hot aqueous liquid is passed through the bed of beads to remove waxes and contaminants deposited on said beads, and thereafter again flowing the oil of low conductivity through the bed of beads.

9. A method as set forth in claim 6 in which the electrostatic field is interrupted periodically and a hot liquid oil is passed through the bed of beads to remove waxes and contaminants deposited on said beads, and thereafter again flowing the oil of low conductivity through the bed of beads.

10. A method as set forth in claim 8 or 9 in which the periodic washing is accomplished by backflushing with an upwardly flowing liquid at a rate to expand the bed and cause relative movement of the beads whereby deposited solid waxes and contaminants are removed from the beads and carried from the mass in said hot backflush liquid.

11. A method as set forth in claim 6 in which the temperature of the oil flowing through the mass of beads is in the range of about 0° C. to about 28° C.

12. A method for removing finely divided electrically nonconductive solid particles, particularly high-melting fatty acid-fatty alcohol esters from a refined liquid salad vegetable oil which comprises slowly tempering said refined oil for at least 12 hours at about 25° C. to about 50° C. to nucleate wax seed crystals, and then holding said oil at about 0° C. to about 28° C. to grow relatively large wax crystals as opposed to shock chilled fine wax crystals and then alternately flowing the oil through a bed of substantially spherical glass-ceramic beads between spacedapart electrodes while maintaining a voltage gradient of at least 2 kilovolts per cm between said electrodes, and backflushing a hot liquid through the bed while the voltage gradient is interrupted to remove solid particles deposited on the glass-ceramic beads, said liquid being hot enough to remove said waxes from said glass-ceramic beads.

13. A method as set forth in claims 1, 6 or 12 in which the electrostatic gradient is unidirectional.

14. The method of claims 6 or 12 wherein said cooled oil is electrofiltered at a temperature of from about 4° C. to about 16° C.

* * * * *